US007231594B1

(12) United States Patent
Hitchcock et al.

(10) Patent No.: US 7,231,594 B1
(45) Date of Patent: Jun. 12, 2007

(54) METHOD FOR PAPERLESS ATTACHMENT OF SUPPLEMENTARY FORMS TO A WORLD WIDE WEB APPLICATION

(75) Inventors: Michael D. Hitchcock, Portland, OR (US); James H. Wolfston, West Linn, OR (US); Matthew W. Hickey, Portland, OR (US)

(73) Assignee: CollegeNET, Inc., Portland, OR (US)

( * ) Notice: Subject to any disclaimer, the term of this patent is extended or adjusted under 35 U.S.C. 154(b) by 0 days.

(21) Appl. No.: 09/501,540

(22) Filed: Feb. 9, 2000

Related U.S. Application Data

(60) Provisional application No. 60/119,496, filed on Feb. 10, 1999.

(51) Int. Cl.
*G06F 17/00* (2006.01)

(52) U.S. Cl. ..................................... 715/505

(58) Field of Classification Search ............... 715/505, 715/506, 507, 508; 358/403, 402
See application file for complete search history.

(56) References Cited

U.S. PATENT DOCUMENTS 5,089,956 A * 2/1992 MacPhail ....................... 707/1

(Continued)

FOREIGN PATENT DOCUMENTS

GB 2244625 A 12/1991

OTHER PUBLICATIONS

Webster's II New College Dictionary, 1995, pp. 55 and 440.*

(Continued)

*Primary Examiner*—Stephen Hong
*Assistant Examiner*—Gregory J. Vaughn
(74) *Attorney, Agent, or Firm*—Michael O. Scheinberg; Scheinberg & Griner Law Offices (57) ABSTRACT

An electronic copy of a paper document, such as high school transcript, can be attached to an electronic document, such as an application for admission to an institution. The high school providing the paper document is required to have only a simple fax machine. When a student requests that a transcript accompany an electronic application, a request for the transcript is automatically generated by the application servicer and transmitted to the high school. The request includes a return facsimile cover sheet that includes an identifier that can be automatically machine-interpreted when the cover sheet is transmitted back to the servicer with the transcript. The identifier marking is sufficiently robust that it will be machine interpretable, even after rough treatment or serial copying and transmission by the high school. Upon receipt of the transcript facsimile, the servicer automatically interprets the identifying information on the return facsimile cover sheet to identify the student and the particular admissions application for which the transcript was request. The transcript is forwarded preferably along with application to the appropriate institution after being converted, if necessary, to a data format specified by the institution. The servicer may also store the transcript in electronic form in a secure database for subsequent transmission for a different term or to different institution. Each facsimile cover sheet is preferably "branded" with the logo of the institution to which the student is applying, although the return facsimile number is preferably a toll free number to a computer facsimile server of the servicer. Thus, the servicer can be invisible to the high school.

11 Claims, 6 Drawing Sheets

U.S. PATENT DOCUMENTS

| | | |
|---|---|---|
| 5,404,294 A | 4/1995 | Karnik |
| 5,450,537 A | 9/1995 | Hirai et al. |
| 5,490,217 A * | 2/1996 | Wang et al. .................. 380/51 |
| 5,640,577 A | 6/1997 | Scharmer |
| 5,659,164 A * | 8/1997 | Schmid et al. .............. 235/375 |
| 5,853,197 A * | 12/1998 | Mowry et al. ................ 283/93 |
| 5,973,791 A | 10/1999 | Yamamuro et al. |
| 2001/0011246 A1 * | 8/2001 | Tammaro ..................... 705/38 |

OTHER PUBLICATIONS

Hart, L: "EDI Speeds Transcript Processing at San Jose State University," EDI Forum, vol. 8, No. 2, pp. 61-64 (1995).

Johnson, David E. et al. "Management Information Systems and Student Affairs," Journal of Research on Computing in Education, vol. 23, No. 1, pp. 127-139 (Fall 1990).

\* cited by examiner

METHOD FOR PAPERLESS ATTACHMENT OF SUPPLEMENTARY FORMS TO A WORLD WIDE WEB APPLICATION

RELATED APPLICATIONS

This application claims priority from U.S. Provisional patent application 60/119,496, filed Feb. 10, 1999.

TECHNICAL FIELD

This invention relates to a method and apparatus for electronic processing of forms over a global computer network, and in particular, to attaching documents from a variety of sources to electronic forms.

BACKGROUND OF THE INVENTION

There are many advantages to the electronic filing of applications for admission to institutions of higher learning, such as colleges and universities. Electronic applications provide the institution with application data almost immediately after the application is completed, and data is in a form that is immediately accessible for processing by admissions personnel to assist in recruiting efforts. Although some schools allow direct electronic application, many chose to take advantage of the special expertise available at service providers, such as CollegeNET, Inc., the creator of the ApplyWeb™ system that services institutions and students by, among other things, processing admission applications. The ApplyWeb™ system is powered by the Universal Forms Engine, which is owned by Universal Algorithms and is described in co-pending U.S. patent application Ser. No. 09/325,533, which is hereby incorporated by reference.

The ApplyWeb™ system handles the applications and fee processing for many institutions and provides the institutions with the data they want in the form they require. ApplyWeb™ services can be transparent to the student, allowing applications to be "branded" with an institution's own logo and making applications accessible to potential students through the university's web site, or through the CollegeNet site of CollegeNET, Inc.

When applicants using the ApplyWeb™ system enter information into an application, the information is stored and automatically populates corresponding fields in subsequent applications. Unfortunately, certain attachments to applications, such as high school transcripts, must still be separately mailed to the institution and processed manually. Thus, until the high school mails a transcript to the college or university, the application package is not complete.

Although some high schools have the equipment to convert a transcript to digital form by scanning and e-mailing the transcript to the institution, many high schools do not yet have such technology. Moreover, upon receiving a scanned transcript, the institution would still have the problem of matching the transcript with the application. Lastly, the large number of high schools and institutions, combined with the many different data formats available, makes electronic data transfer directly between high schools and institutions a difficult problem.

SUMMARY OF THE INVENTION

An object of the invention is paperless processing of admission applications.

Another object of the invention is to present a complete electronic applications package to an institution.

Another object of the invention is to allow high schools with technology limited to a simple fax machine to provide electronic transcripts in a form useful to an institution.

Still another object of the invention is to allow electronic admissions applications to be sufficiently complete for processing without requiring mailing of attachments.

Yet another object of the invention is to facilitate the attachment of documents from any of multiple sources to an electronic form to be transmitted to any of multiple destinations.

Additional objects, advantages and novel features of the invention will become apparent from the detailed description and drawings of the invention.

In accordance with the invention, an electronic copy of a high school transcript can be attached to an electronic application for admission to an institution. The high school providing the transcript is required to have only a simple fax machine. When a student requests that a transcript accompany an electronic application, a request for the transcript is automatically generated by the application servicer and transmitted to the high school. The request includes a return facsimile cover sheet that includes an identifier that can be automatically machine-interpreted when the cover sheet is transmitted back to the servicer with the transcript. The identifier marking is sufficiently robust that it will be machine interpretable, even after rough treatment or serial copying and transmission by the high school. Upon receipt of the transcript facsimile, the servicer automatically interprets the identifying information on the return facsimile cover sheet to identify the student and the particular admissions application for which the transcript was request. The transcript is forwarded preferably along with application to the appropriate institution after being converted, if necessary, to a data format specified by the institution.

The servicer may also store the transcript in electronic form in a secure database. When the student completes another application for admission to a different institution or a different term, the electronic copy of the transcript can be attached to the new application without requiring another transmission from the high school. Each facsimile cover sheet is preferably "branded" with the logo of the institution to which the student is applying, although the return facsimile number is preferably a toll free number to a computer facsimile server of the servicer. Thus, the servicer can be invisible to the high school.

The system of the present invention eliminates the requirement for the institution to match up a later-received paper transcript with an earlier received electronic application. It also simplifies the high school's job of sending transcripts because the high school does not need to read and understand the student's request, verify the student's signature, identify the institution to which the transcript is to be mailed, generate a transmittal letter, and address and put postage on an envelope. A facsimile request in accordance with the invention is in a standard, easy to read format and the high school merely reads the clearly identified student name and transmits the transcript to the toll free number using the cover sheet provided.

The invention is not limited to use with high school transcripts and admissions applications, but is useful in any situation in which documents from multiple providers need to be associated together and forwarded to a document recipient. In particular, the invention can be used when one or more documents from one or more document providers from a first group of document providers needs to be associated with an electronic form for transmission to one or more members of a group of recipients. The invention solves the problem of collating multiple documents from multiple sources of varying technological capacities for forwarding to multiple recipients.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF PREFERRED EMBODIMENTS

Figure 1:
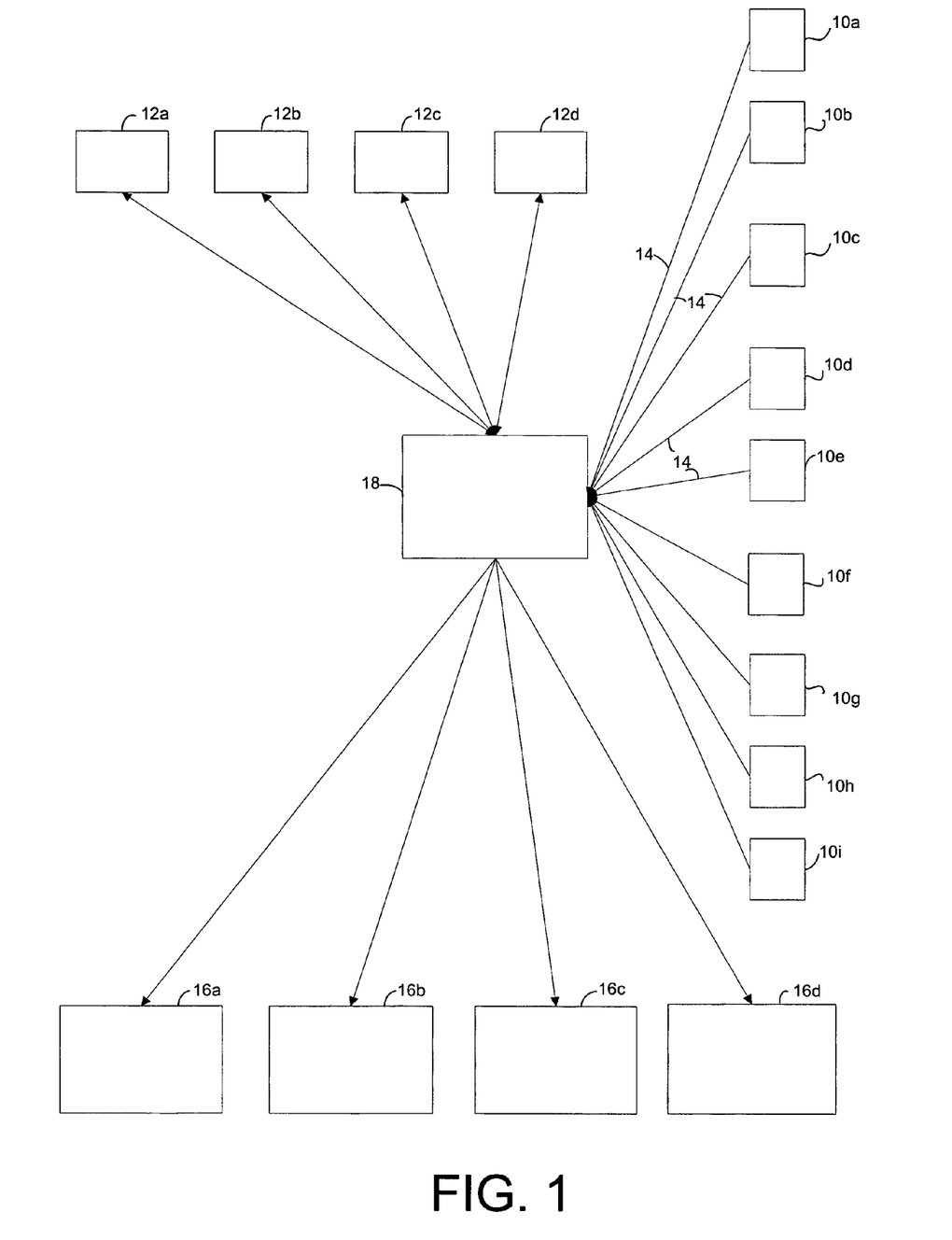
FIG. 1 is a block diagram showing multiple applicants, high schools, and institutions sharing transcript information through a servicer.

FIG. 1 is a block diagram showing the flow of information in a preferred embodiment of the present invention, in which students 10a–10i (referred to generally as student 10) can submit electronic admission applications including electronic copies of transcripts from high schools 12a–12d (referred to generally as high school 12) over a computer network 14, such as the Internet, to institutions 16a, 16b, 16c, or 16d (referred to generally as institution 16).

The admissions applications are preferably administered by a servicer 18 that can present an application that is customized and branded for any institution. Servicer 18 can also verify application filing time windows, maintain student information to populate fields of subsequent application, customize the format of the application data for each institution, provide standardized test scores from the tester's database, and handle the electronic payment of the application fee. Servicer 18 may also provided other services to the students and institutions, such as recruiting and school-student matching assistance.

Figure 2:
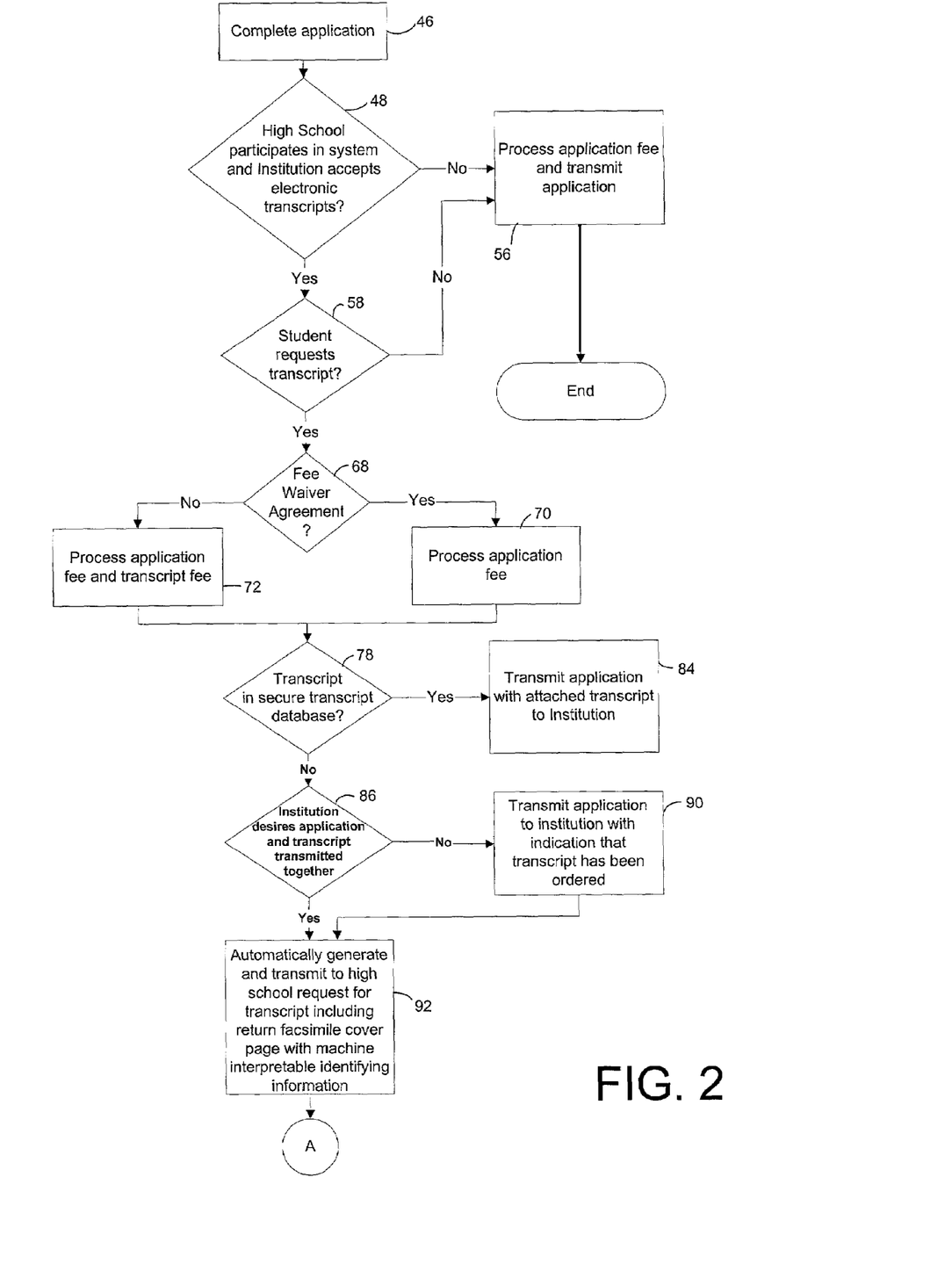
FIG. 2 is flow chart showing steps of a method of the present invention.
Figure 3:
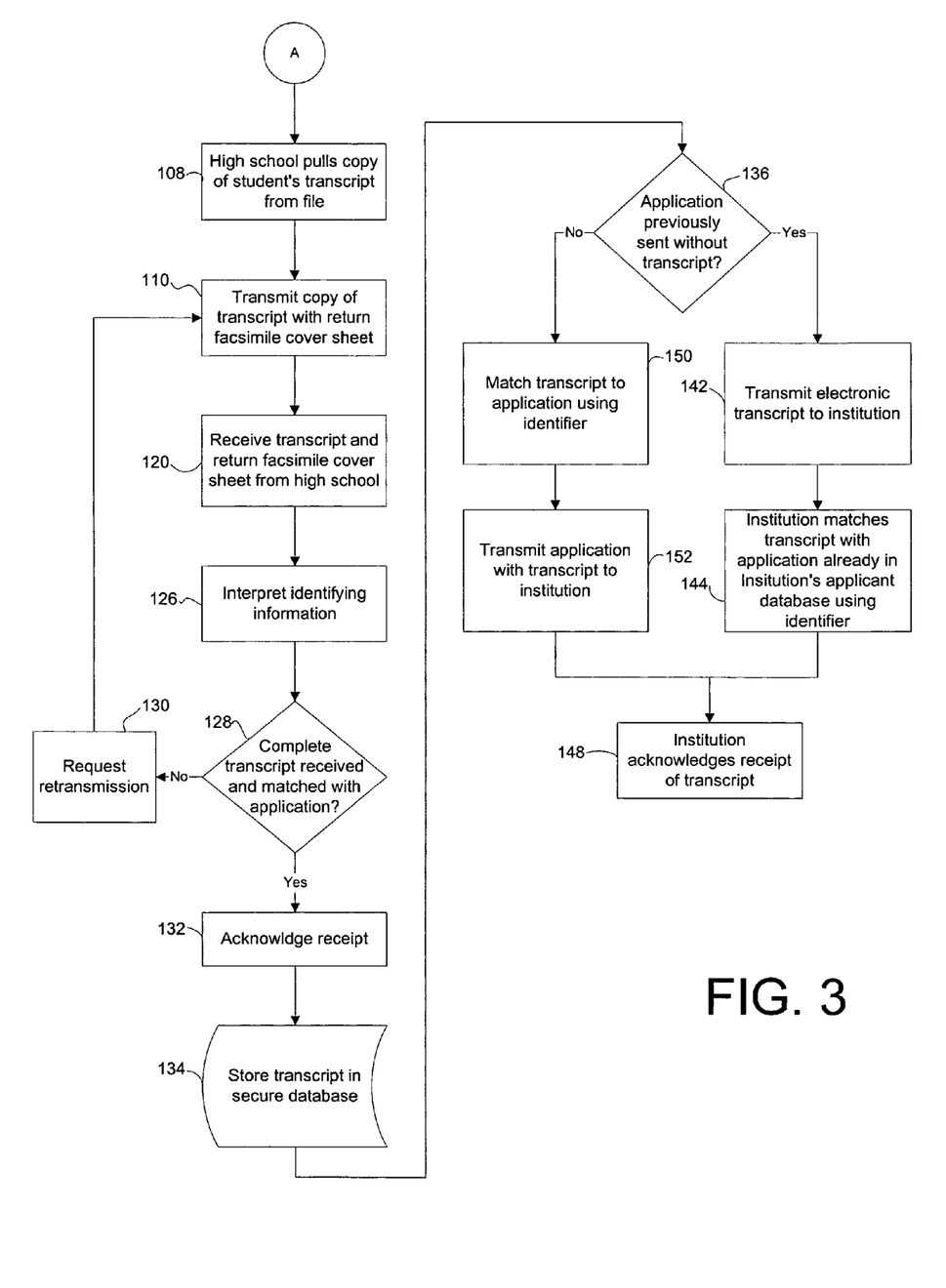
FIG. 3 is flow chart showing additional steps of a method of the present invention.
Figure 4:
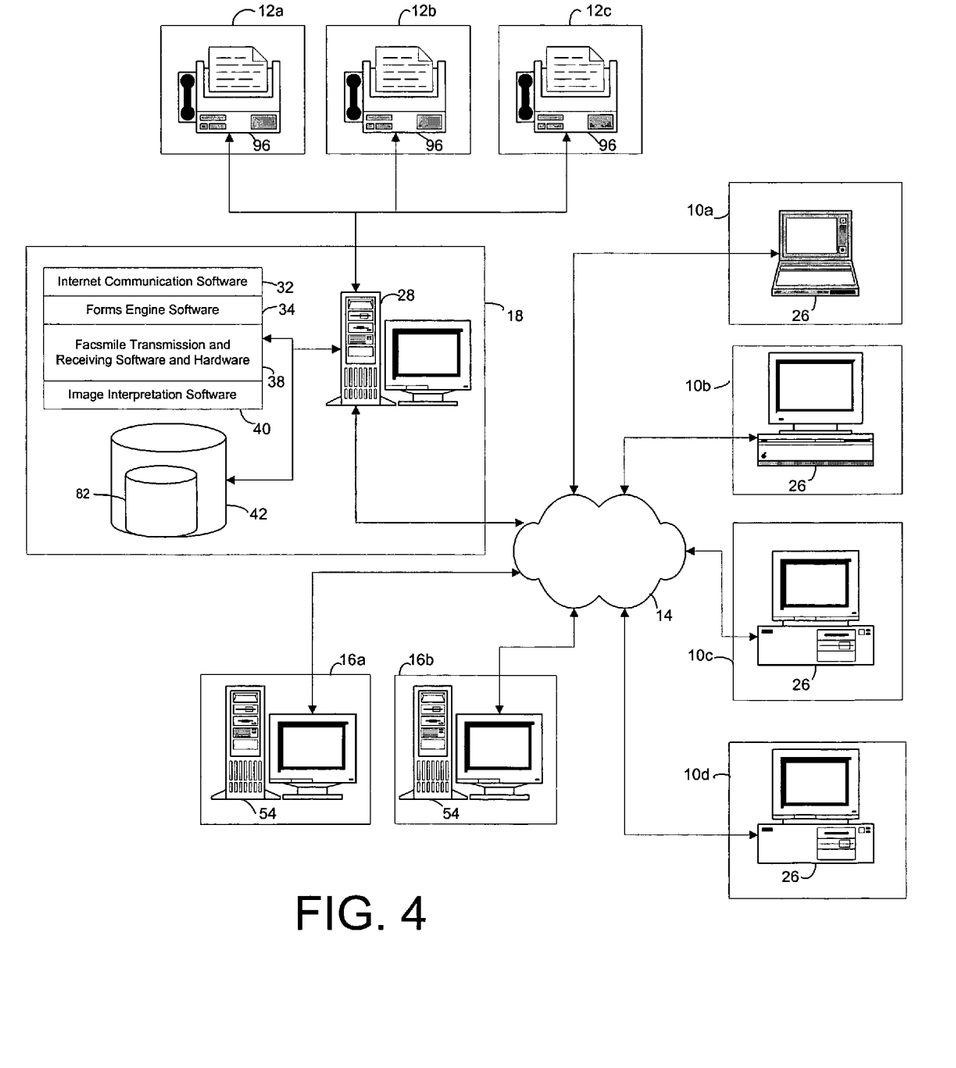
FIG. 4 is a block diagram showing the hardware and software used in carrying the method of FIGS. 2 and 3.

FIGS. 2 and 3 show the steps involved in a preferred embodiment of the present invention, and FIG. 4 shows some of the hardware and software used in those steps. A student 10 uses a student computer 26, such as an IBM compatible or a Macintosh personal computer, to request over computer network 14, preferably the Internet, an electronic application form from servicer 18. Servicer 18 operates one or more server computers 28, such as Sun Solaris UltraSparc Servers, for carrying out the invention. Server computer 28 executes Internet communications software 32 software, such as Apache HTTPD Server from The Apache Group, [www.apache.org], to communicate over the Internet Server computers 28 also executes, preferably behind a firewall, forms software 34, such as the Universal Forms Engine described in U.S. patent application Ser. No. 09/325,533, for generating and processing application forms. Server computer 28 also executes facsimile transmission and receiving software 38, such as Hylafax™ available from hylafax.org, and image recognition software 40, such as OCR Shop software available from Vividata, Inc. for sending and receiving facsimiles and for converting facsimile images into text. Server 28 includes data storage 42 for storing information used in carrying out the invention. Skilled persons will understand that, although server 28 is depicted as a single computer, separate computers are preferably used for Internet communications, facsimile communications, and for application execution. The software operating on the various computers communicate with each other using standard protocols such as CGI or Apache API.

As student 10 completes each page of an application, the data typically undergoes some preliminary data verification. After student 10 has completed all the pages of the application, as shown in step 46, the servicer is ready to attach addition forms, process the application fee, and transmit the application to the institution.

At this time, step 48 shows that forms engine 34, checks information in data storage 42 to see whether the student's high school 12 participates in the transcript program. Each high school has a unique identifier. The identifier could be, for example, the ACT/CEEB standard high school code, another code, or some combination of the high school name and address. The names and/or codes of the high schools participating in the program are maintained in a database. The name or code of the student's high school is available to the CGI program because it had processed previous pages of the application, one of which included the name of the high school.

Step 48 also shows that the CGI program checks to determine whether the institution to which the student is applying accepts electronic transcripts with its electronic applications. If either condition is not met, the forms engine processes the application fee and transmits the application to an institution computer 54 at institution 16 in step 56. If both conditions are met, the forms engine presents information to student 10 describing the electronic transcript system, including the fee, if any, and presents student 10 with an option in step 58 to transmit a transcript with the application.

If the student indicates that no electronic transcript is to be sent, the regular application fee is processed and the application is forwarded to the institution in step 56. If the student indicates that he desires a transcript to be sent with his application, the forms engine checks in step 68 to see whether there is a transcript fee waiver agreement between the institution and the high school. In a transcript fee waiver agreement, the institution may agree to pay the cost of the transcript for the student. Institutions may use such agreements with high schools in low income areas. Moreover, such agreements encourage the students to use the electronic transcript service, thereby simplifying application processing for the institution, which does not then need to process the paper transcript. If there is a transcript fee waiver agreement in place, step 70 shows that the application fee alone is processed. If there is no transcript fee waiver agreement, step 72 shows that the application fee and the transcript fee are processed. Processing a fee entails initiating the electronic funds transfer process to pay for the transaction.

The forms engine then checks in step 78 to see whether a current transcript is available in a secure transcript database 82 in data storage 42. If a current transcript is available, the transcript in electronic form is attached to the electronic application and both are sent in step 84 in electronic form to institution computer 54 at the institution 16. An indication in the transmittal data for the application informs the institution that a transcript is attached.

Figure 5:
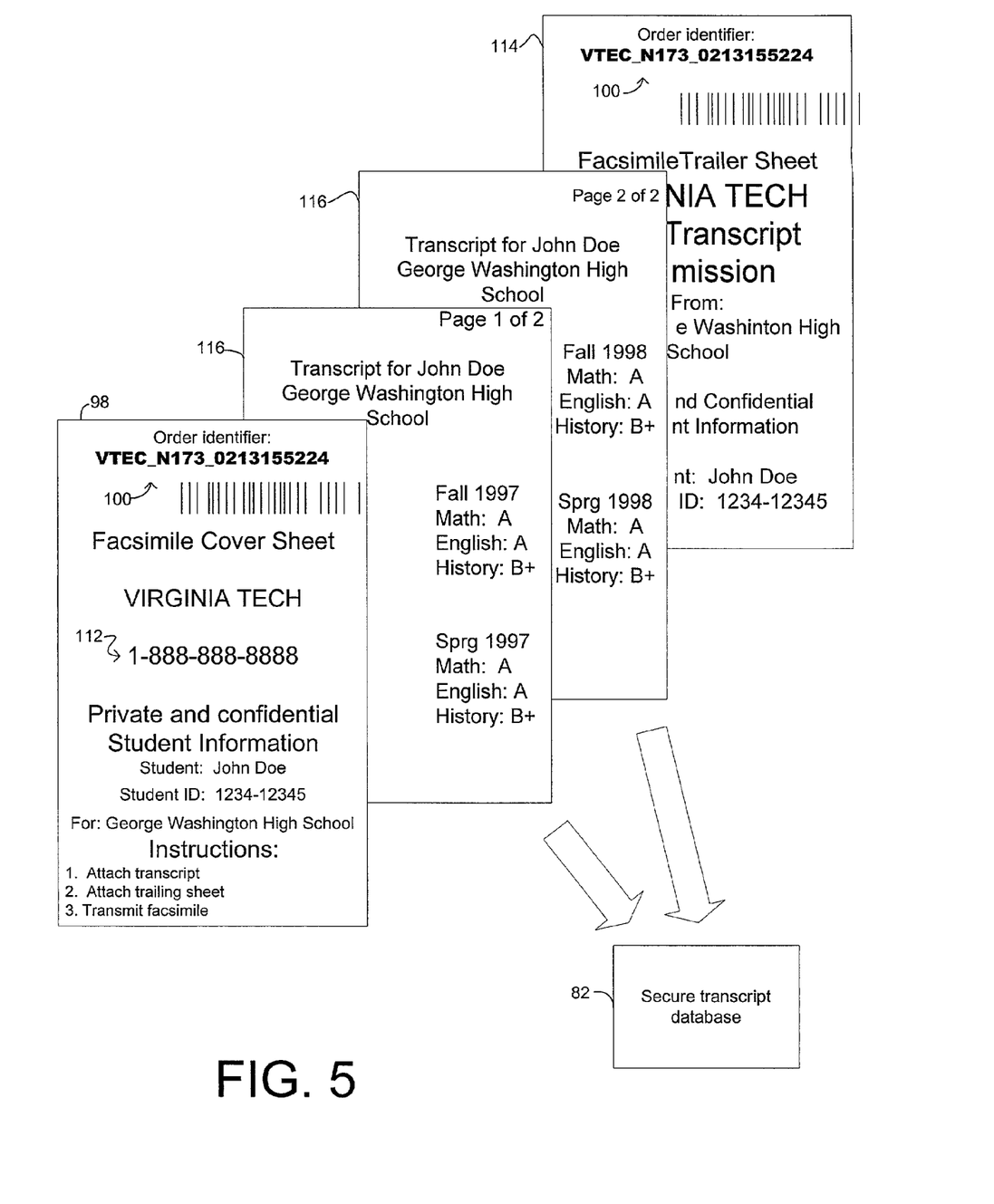
FIG. 5 shows a simplified drawing of a package including a return facsimile transmitted by the high school to the servicer.

If secure transcript database 82 does not include a current transcript, step 86 shows that the forms engine checks to see whether the institution is willing to accept the application with the transcript to follow. If so, step 90 shows that the application is transmitted to an institution computer 54 with a flag indicating that a transcript has been ordered but is not attached. In most cases, institution 16 will prefer that servicer 18 retain the application until a transcript is available and can be attached to the application. In step 92, a request for the transcript is automatically generated and transmitted to the high school, typically via facsimile. A fax machine 96 at the high school receives the request. The request identifies the student that is requesting the transcript, preferably by name and student identification number. The request also includes a facsimile cover sheet 98 (FIG. 5) for high school 12 to use when transmitting the transcript back to servicer 18. FIG. 5 shows the transcript package returned via facsimile from the high school high school 12 to servicer 18. The return facsimile cover sheet 98 includes machine-interpretable identifying information 100 so that the transcript following the cover sheet can be readily associated with the proper student and application at servicer 18 without human intervention.

For example, the identifying information can be in the form of alphanumeric characters in a font that is readable by commercial optical character recognition software or in the form of bar code. Such fonts and bar codes and their interpreters are well known in the art. Identifying information 100 on facsimile cover sheet 98 must be robust so that it will be machine recognizable, even after rough treatment and serial photocopying and facsimile transmission by the high school. Identifying information 100 is therefore preferably in a very large optical character recognition (OCR) font or bar code. Although FIG. 5 shows identifying information in both bar code and character format, either format alone is sufficient. The identifying information could include, for example, an order identifier including a code for the institution to which the application is addressed, the student's user identifier and a date-time code indicating when the application was submitted.

Upon receiving the transcript request on its facsimile machine 96, high school 12 obtains a copy of the student's transcript from its files or database in step 108 (FIG. 3) and in step 110 transmits the copy via facsimile to a toll free number 112 specified on the return facsimile cover sheet 98. In some embodiments, a facsimile trailing sheet 114 is also included in the request transmitted to high school 12. The trailing sheet 114 is used by the automated software at servicer 18 to signal the end of a multi-page transcript 116.

The facsimile of the high school transcript 116 and cover sheet 98 from the high school is received by a computer 28 at servicer 18 in step 120. A program in a facsimile server portion of computer 28 converts the data from facsimile format to a data format that can be processed by the appropriate interpretation software 40 to interpret in step 126 the identifying information 100 on the cover sheet 98. For example, the facsimile data may be converted to a standard graphics file that can be used with optical character or bar code recognition software. Such software is well known in the art. The identifying information is then interpreted and the transcript is matched with a specific student and application. Thus, facsimile information from the high school is preferably processed automatically, entirely in electronic form, and it need not be printed.

Step 128 shows that if the transmission was unsuccessful, either because the cover page could not be matched with an application or because the complete facsimile was not received, a request for retransmission is sent to the high school in step 130, preferably as part of a periodic status report describing the status of all pending transcript requests. When the transcript is successfully received and the cover sheet is interpreted and matched with an application, servicer 18 transmits an acknowledgment in step 132 to the sending high school either individually for each transcript or as part of a status report.

In step 134, the electronic version of the transcript is stored in secure, encrypted storage 82 at servicer 18. In step 136, the forms engine determines whether the application was previously transmitted to the institution without a transcript. If so, step 142 shows that the transcript is forwarded to the institution, where it is matched to the application in step 144, and receipt of the transcript is acknowledged in step 148. In the more common case in which the application was held by servicer 18 pending receipt of transcript 32, servicer 18 now automatically attaches transcript 116 to the application in step 150 and forwards the package to the institution in step 152. Institution 16 can store the received transcript as part of the admissions application for viewing when they review the transcript, or it can print the transcript and maintain it in a physical file. In step 148, the institution acknowledges receipt of the electronic transcript, preferably as part of a periodic status update. Servicer 18 can provide the transcript in any electronic format specified by the institution An expiration date can be assigned to stored transcript 116, after which time it will not be used. High schools can be requested to automatically update the transcripts stored in the transcript database 82 at periodic intervals. Servicer 18 sends status reports to each high school 12 periodically, providing status information of pending transcripts request, transcripts received, and requests for re-transmittal (i.e., in the case that the received document was illegible).

The system is preferably integrated into a complete applications system, that can access, for example, standardized test results and provide those results as part of admissions applications to institutions 16, thereby ensuing the integrity of the scores on the application and obviating the need to have the testing entity mail the scores to the institution.

Like the application itself, a transcript contains private information that cannot be released without authorization from the student. When a student completes an application with the servicer, the student can authorize transmission of the transcript. The servicer requires a credit card number to process any transaction, thereby providing a level of security by identifying the transcript requester. Moreover, transcripts are transmitted only to the servicer, who forwards the transcripts only to institutions registered with it and specified by the student.

A transcript can be transmitted via facsimile from any high school that is willing to accept a request from the servicer and return the facsimile request using the return facsimile cover sheet. It is desirable, however, for high schools to register with the institution or servicer so that they can be instructed in the system and be assured that any transcript request has been authorized by the student. Because transmission of the facsimile copy of the transcript from the high school to servicer 18 is typically over telephone lines and not over the open Internet, the transcript need not be encrypted during that transmission.

Figure 6:
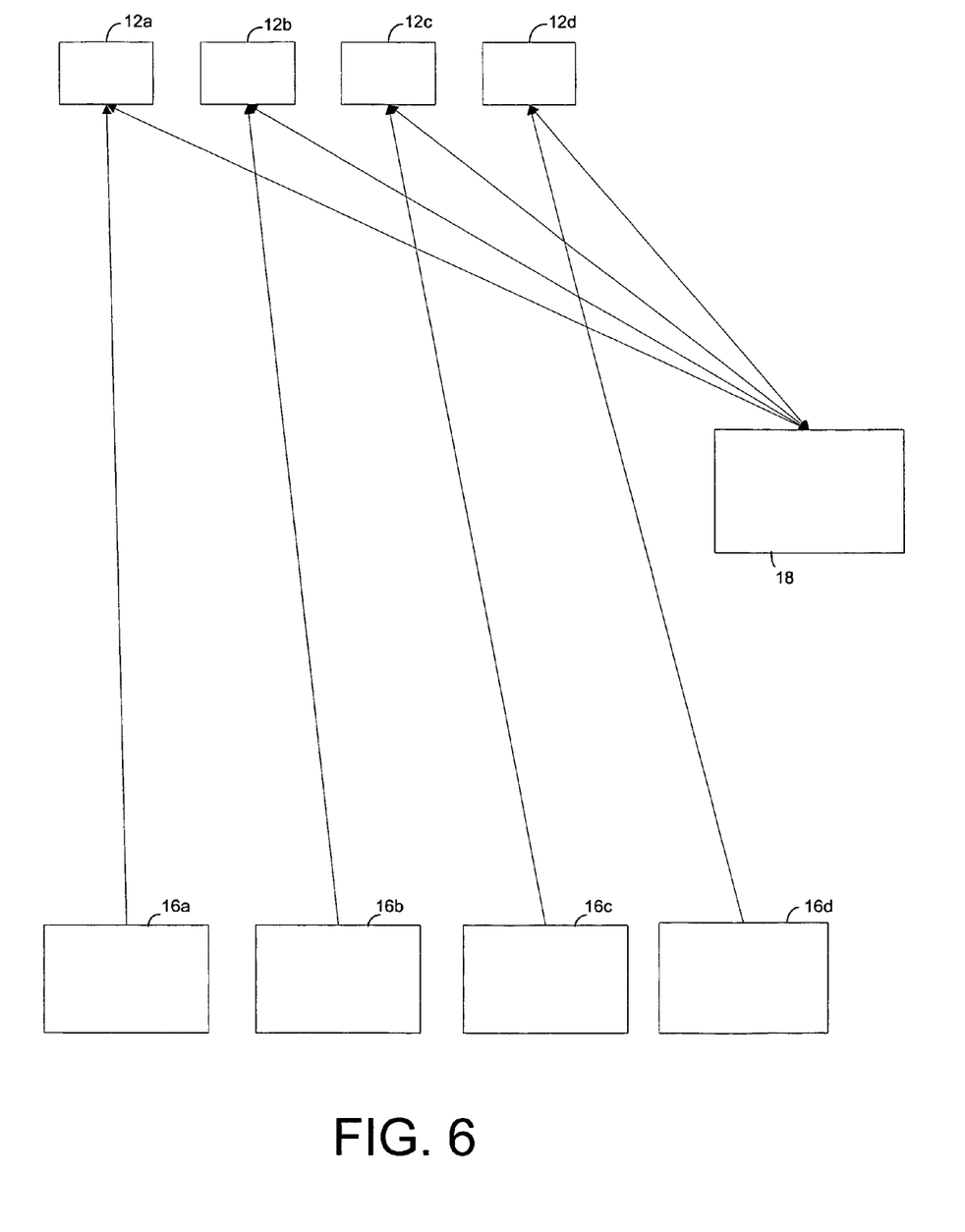
FIG. 6 is a block diagram showing institutions contacting high schools to enlist them in the system.

One method of registering participating high schools, shown schematically in FIG. 6, is to have institutions request that their primary feeder schools participate in the system. The institution that contacts the high school provides it with a sample facsimile cover sheet and instructs the high school in using the system. The high school commits to forward transcripts in a timely manner and review regular status reports to ensure that transcripts are being transmitted successfully. In return, the high school's administrative overhead associated with sending transcripts is greatly reduced, and postage costs for transcripts is eliminated. The high school is no longer required to read and understand each student's transcript request, verify the student's signature, identify the institution to which the transcript is to be sent, generate a transmittal letter, and address and post an envelope.

Once a high school is registered by one institution, any student of that high school can have his transcript sent to any institution using servicer 18. Institutions could also be notified by servicer 18 when a student applies from a high school that is not yet registered, and the institution or the servicer can contact the high school and enlist it in the program. Institutions that recruit a high school into the system could add the high school to the database of registered high schools.

In an integrated application system such as the ApplyWeb® system of the assignee, the status of the transcript request can be displayed in the applicant's 'Personal Log' of the application processing system. The log can show, for example, that the transcript has been transmitted to the institution from secure electronic storage or that a request for transcript has been transmitted to the high school, but the transcript is not yet received.

Although the present invention and its advantages have been described in detail, it should be understood that various changes, substitutions and alterations can be made herein without departing from the spirit and scope of the invention as defined by the appended claims. For example, information in the transcript itself can be interpreted by the automated software and converted to text, so that the transcript information can be saved as text or data base entries, rather than as graphical data. Skilled persons will recognize that the invention can be used in a wide variety of situations in which it is necessary to attach information to a form, such as attaching a resume or a writing sample to an employment application. The invention could also be implemented by an individual institution, rather than through a provider that services multiple institutions.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method of online processing of electronic applications for admission to institutions, the applications requiring additional documents obtainable from third parties, comprising:

transmitting over a computer network to an applicant an electronic application form to complete;

receiving over the computer network from the applicant the electronic application form including information entered by the applicant;

automatically generating a request bearing a machine readable code and human readable information, the human readable information specifying a document to be retrieved and associated with the electronic application form;

automatically transmitting the request to a third party via facsimile;

receiving from the third party as facsimile data both the document requested and the request; and automatically reading the facsimile data and determining from the machine readable code on the request the electronic application form with which to associate the document; and automatically associating the document with the electronic application form, the third party using only a facsimile transmission device to transmit the document and the machine readable code facilitating automatic matching of the document with the electronic application forms.

2. The method of claim 1 in which receiving from the third party as facsimile data both the document requested and the request includes receiving a transcript.

3. The method of claim 1 in which automatically generating a request bearing a machine readable code includes automatically generating a request bearing a bar code.

4. The method of claim 1 in which automatically generating a request bearing a machine readable code includes automatically generating a request bearing machine recognizable alphanumeric characters.

5. The method of claim 1 in which transmitting to an applicant an electronic application form includes transmitting an electronic application form for applying for admission to a first institution and further comprising storing the document in electronic format, the stored document being associated with the applicant and being available to transmit to other institutions in association with subsequent electronic application forms completed by the applicant.

6. The method of claim 5 further comprising transmitting over a computer network to the applicant a second electronic application form to complete;

receiving over the computer network from the applicant the second electronic application form including information entered by the applicant;

automatically associating the stored document with the second electronic application form; and transmitting to the second institution the stored document and the second electronic application form.

7. The method of claim 1 in which automatically transmitting the request to a third party includes verifying that the third party has agreed to return the document via facsimile.

8. The method of claim 1 in which transmitting over a computer network to an applicant an electronic application form includes transmitting an electronic application form for applying for admission to an institution and in which automatically transmitting the request to a third party includes verifying that the institution to which the applicant is applying accepts electronic attachments to its electronic application forms.

9. The method of claim 1 in which transmitting over a computer network to an applicant an electronic application form includes transmitting an electronic application form for applying for admission to an institution and further comprising transmitting the electronic application form and the received document to the institution.

10. The method of claim 9 in which transmitting the electronic application form and the document to the institution includes transmitting the electronic application form and the document together to the institution.

11. The method of claim 9 in which transmitting the electronic application form and the document to the institution includes transmitting the electronic application form and the document at different times, the institution using the identifying information to match the document with the electronic application form.

* * * * *